United States Patent [19]

Heintz

[11] 4,049,889
[45] Sept. 20, 1977

[54] HERMETICALLY SEALED ALKALI METAL BATTERY CONTAINER

[75] Inventor: Walter K. Heintz, Westland, Mich.

[73] Assignee: Ford Motor Company, Dearborn, Mich.

[21] Appl. No.: 719,881

[22] Filed: Sept. 1, 1976

[51] Int. Cl.² .................................................. H01M 2/02
[52] U.S. Cl. ..................................... 429/174; 429/176; 429/185
[58] Field of Search ................. 429/104, 101–103, 429/30, 163, 176, 191, 185, 174

[56] References Cited
U.S. PATENT DOCUMENTS

| | | | |
|---|---|---|---|
| 3,475,220 | 10/1969 | Knorr | 429/104 |
| 3,758,337 | 9/1973 | Fally et al. | 429/63 X |
| 3,826,685 | 7/1974 | Dubin et al. | 429/191 |
| 3,946,751 | 3/1976 | Breiter | 429/166 |

Primary Examiner—Anthony Skapars
Attorney, Agent, or Firm—William E. Johnson; Keith L. Zerschling

[57] ABSTRACT

The invention is embodied in a hermetically sealed alkali metal battery container. Two opposed outer metallic casings are hermetically sealed to a ceramic ring which supports an inner casing of a solid alkali ion-conductive material. The hermetic seal is accomplished by means of annular ridges on metal rings associated with the two outer casings and a pair of washers interposed between the annular ridges and respective top and bottom surfaces of the ceramic ring.

4 Claims, 2 Drawing Figures

HERMETICALLY SEALED ALKALI METAL BATTERY CONTAINER

BACKGROUND OF THE INVENTION

A recently developed type of secondary or rechargeable electrical conversion device comprises: [1] an anodic reaction zone containing a molten alkali metal anode-reactant, e.g., sodium, in electrical contact with an external circuit; [2] a cathodic reaction zone containing [a] a cathodic reactant comprising sulfur or a mixture of sulfur and molten polysulfide, which is electrochemically reversible reactive with the anodic reactant; [b] a solid electrolyte comprising a cation-permeable barrier to mass liquid transfer interposed between and in contact with the anodic and the cathodic reaction zones; and [c] electrode devices within the cathodic reaction zone for transporting electrons to and from the vicinity of the cation-permeable barrier. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the electrode by reaction of the cathodic reactant with the electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable solid electrolyte.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur.

It is the principal object of this invention to provide a structure for containing an alkali metal battery in which electrical insulation is provided between the anodic and cathodic reaction zones and a secure seal is formed so that the reactants are not lost from the battery.

SUMMARY OF THE INVENTION

This invention is directed to a structure for containing an alkali metal battery and, more particularly, to a structure for containing such a battery which provides effective electrical insulation of a battery's anodic and cathodic zones and a seal against loss of reactants from such zones.

In accordance with the general principles of this invention, a structure for containing an alkali metal battery includes a ceramic ring having top and bottom surfaces. An inner casing of solid alkali ion-conductive material having one open end is attached at a portion of its outer wall near its open end to an interior surface of the ceramic ring so that the inner casing extends downwardly from the bottom surface of the ceramic ring. A first outer metal casing with an open end and a closed end surrounds the inner casing and is spaced therefrom. A first metal ring encircles and is welded to the open end of the first outer casing. This metal ring [a] has a raised annular ridge encircling the open end of the first metal casing, [b] has at least a pair of openings for receiving bolts therethrough, and [c] is adjacent the bottom surface of the ceramic ring. A first pair of thin metal washers are positioned between the raised annular ridge of the first metal ring and the bottom surface of the ceramic ring. The washer adjacent the first metal ring has a coefficient of thermal expansion closely matching that of the first metal ring. The washer adjacent the ceramic ring has a coefficient of thermal expansion closely matching that of the ceramic ring.

A second outer metal casing having an open end and a closed end has associated therewith a second metal ring which encircles and is welded to the open end of the second outer metal casing. The second metal ring [a] has a raised annular ridge encircling the open end of the second outer metal casing, and [b] is located adjacent the top surface of the ceramic ring whereby the second outer casing is spaced from and extends in an opposite direction from the ceramic ring than does the first outer casing. A second pair of thin metal washers similar to the first pair of thin metal washers are positioned between the raised annular ridge of the second metal ring and the top surface of the ceramic ring.

A Belleville spring encircles the second outer metal casing and engages an upper surface of the second metal ring. A third metal ring encircles the second outer metal casing. This third metal ring engages an upper surface of the Belleville spring and has at least a pair of spaced openings aligned with the openings of the first metal ring for receiving bolts therethrough. At least a pair of nut and bolt assemblies extend through the first and third metal rings and are securely tightened together to draw the annular ridges on the first and the second metal rings tightly into engagement with the first and the second pair of metal washers to provide a hermetically sealed alkali metal battery container.

By using a pair of thin metal washers as described above, a provision is made for the mismatch in coefficient of thermal expansion between ceramic and metal which produces a dimensional change in the materials as they are heated from room temperature to operational temperatures.

DESCRIPTION OF THE PREFERRED EMBODIMENT

Figures 1, 2:
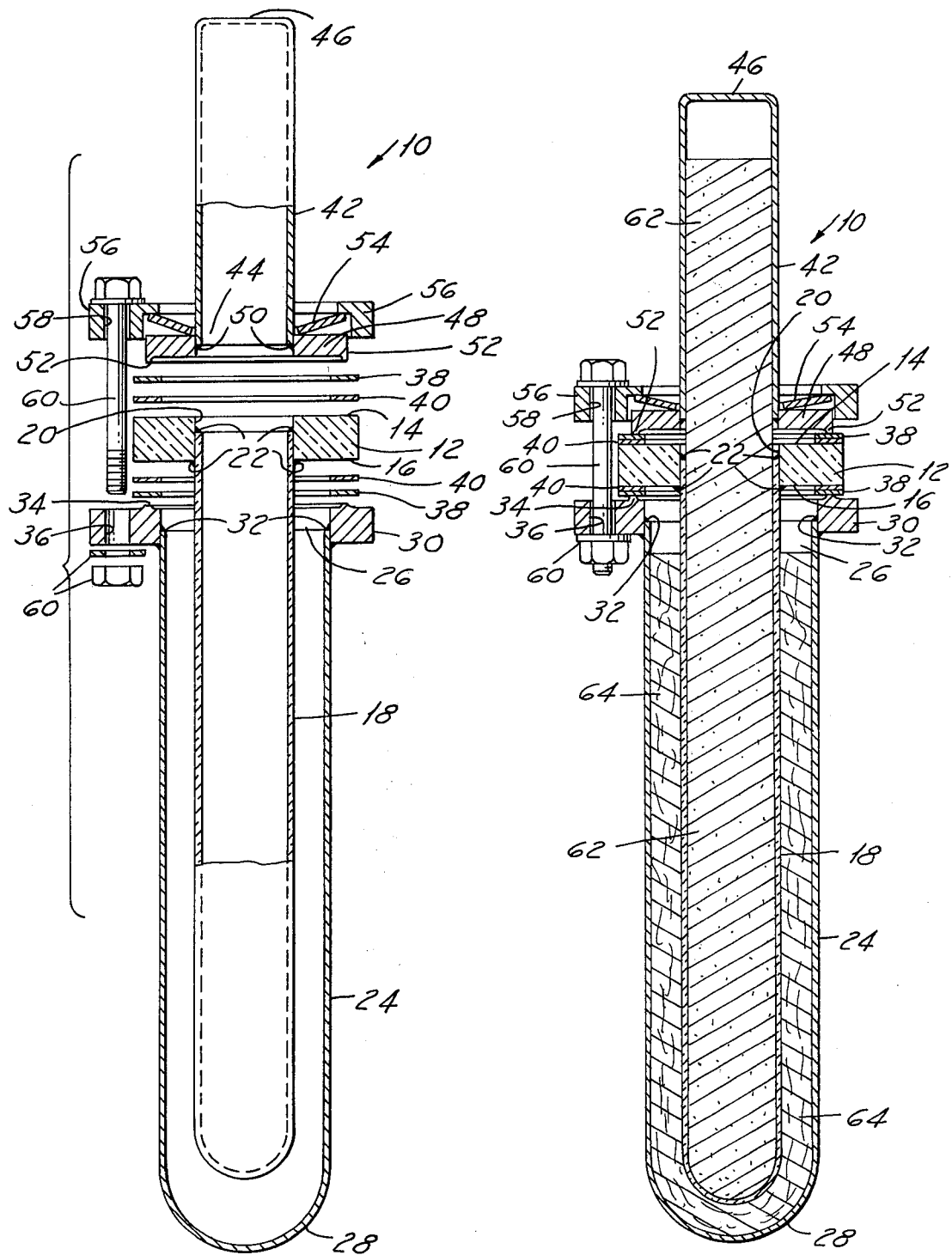
FIG. 1 is an elevational view, in cross section, of the alkali metal battery structure of this invention in a disassembled condition.
FIG. 2 is an elevational view, in cross section, of the hermetically sealed alkali metal battery of this invention in an assembled condition.

The type of secondary electrical conversion batteries to which this invention relates are disclosed in the following U.S. Pat. Nos. 3,404,035; 3,404,036; 3,446,677; 3,458,356; 3,468,709; 3,468,719; 3,475,220; 3,475,223; 3,475,225; 3,535,163; 3,719,531; and 3,811,493.

A novelty search conducted on the structure of this invention resulted in the citation of the following prior art, all U.S. Pat. Nos. 2,646,997; 3,188,116; 3,398,978;

3,419,432; 3,468,709; 3,632,143; 3,650,550; 3,746,347; 3,918,919; and 3,946,751.

In FIGS. 1 and 2 there is seen a hermetically sealed alkali metal battery designated generally by the numeral 10. This battery includes a ceramic ring 12 which has a top surface 14 and a bottom surface 16. The ceramic material may be formed from a material such as alpha alumina of high purity, such as 99.8%.

An inner casing 18 of a solid alkali ion-conductive material is in the form of a closed end tube. This casing is used as a reaction zone separator and is made from a material which will permit the transfer of ions of an anodic reactant therethrough to a cathodic reactant. The barrier may have a thickness in the range of about 20 to 2,000 microns and may be made of a material such as glasses and polycrystalline ceramic materials as is well known in the art. One material which is extremely useful in beta-type alumina or sodium beta-type alumina. The inner casing is bonded near its open end within and to an interior surface 20 of the ceramic ring 12 by means of a glass seal 22 so that the inner casing extends downwardly from the bottom surface 16 of the ceramic ring.

A first outer metal casing 24 with an open end 26 and a closed end 28 surrounds the inner casing 18 and is spaced therefrom.

A first metal ring 30 encircles and is welded by weldment 32 to the first outer metal casing 24. This first metal ring 30 is formed of a metal such as a stainless steel and has a raised annular ridge 34 encircling the open end 26 of the first outer metal casing 24 for a purpose described in detail herein below. The first metal ring also has at least a pair of openings 36 (only one shown) for receiving bolts therethrough. In its assembled condition the first metal ring is located adjacent the bottom surface 16 of the ceramic ring 12.

A first pair of thin metal washers 38 and 40 are positioned between the raised annular ridge 34 of the first metal ring 30 and the bottom surface 16 of the ceramic ring 12. The washers have a thickness in the range of 0.003 to 0.005 inches. The washer 38 adjacent the first metal ring 30 may be formed of hardened polished steel and has a coefficient of thermal expansion closely matching that of the first metal ring. The metal washer 40 adjacent the ceramic ring 12 may be formed from "Radar", a product name for a cobalt, nickel, iron alloy which has a coefficient of thermal expansion closely matching that of the ceramic ring.

A second outer metal casing 42 has an open end 44 (shown only in FIG. 1). A second metal 48 encircles the open end 44 of the second outer metal casing 42 and is secured thereto by weldment 50 (shown in FIG. 1 only). This second metal ring is formed from the same material as the first metal ring and it also has a raised annular ridge 52 encircling the open end 44 of the second outer metal casing 42. In its assembled condition, the second metal ring 48 is adjacent the top surface 14 of the ceramic ring 12 whereby the second outer casing 42 is spaced from and extends in an opposite direction from the ceramic ring than does the first outer casing 24.

A second pair of thin metal washers 38 and 40 are positioned between the raised annular ridge 52 of the second metal ring 48 and the top surface 14 of the ceramic ring 12 for the same purposes as the washers were placed between the raised annular ridge 34 of the first metal ring 30 and the bottom surface 16 of the ceramic ring 12.

A Belleville spring 54 encircles the second outer metal casing 42. This spring also engages an upper surface of the second metal ring 48.

A third metal ring 56 also encircles the second outer metal casing 42. This third metal ring engages an upper surface of the Belleville spring 54. The third metal ring also has at least a pair of spaced openings 58 (only one shown in the drawing) aligned with the openings 36 in the first metal ring 30 for receiving bolts therethrough.

At least a pair of nut and bolt assemblies 60 (only one shown in each figure) are shown in their unassembled condition in FIG. 1 and in a securely tightened position in FIG. 2. In the securely tightened position, the nut and bolt assemblies draw together the annular ridges 34 and 52 to compress the first and second pair of thin metal washers 38 and 40 tightly into engagement with one another and with the bottom surface 16 and the top surface 14 of the ceramic ring 12 to provide a hermetic seal for the alkali metal battery 10. Pressure is placed on this assembly through the action of the Belleville spring 54 when the nut and bolt assemblies are tightened down.

By utilizing the two pairs of metal washers 38 and 40, the mismatch in coefficient of thermal expansion between the ceramic ring 12 and the first metal ring 30 and second metal ring 48 are compensated for. The first and second washers 38 and 40 may at their interface slide back and forth sufficiently to adjust for the differences in coefficient of thermal expansion. Thus, the hermetic seal of the battery remains even though the battery is cycled through temperature variations from room temperature to operational temperatures.

With reference to FIG. 2, a first reaction zone 62 is formed by the interior of the second outer metal casing 42 and the interior of the inner casing 18. This reaction zone may contain an anodic reactant. The anodic reactant is heated by any conventional source and may be viewed as the anode proper or conductor through which electron flow to an external circuit (not shown) is achieved. Molten sodium is employed as the anodic reactant in most preferred embodiments of such alkali metal batteries. However, potassium, lithium, other alkali metals, mixtures of such alkali metals or alloys containing such alkali metals can be used.

A second reaction zone 64 (shown only in FIG. 2) is formed in the volume between the interior surface of the first outer metal casing 24 and the exterior surface of the inner casing 18. This reactant zone can contain the cathodic reactant. The cathodic reactant of the fully charged battery is molten sulfur, which is electrode chemically reversibly reactive with the anodic reactant. As the battery is discharged, the mole fraction of elemental sulfur drops until the open circuit voltage remains constant. During this portion of the discharge cycle as the mole fraction of sulfur drops from 1.0 to approximately 0.72, the cathodic reactant displays two phases, one being essentially pure sulfur and the other being sulfur saturated with alkali metal polysulfide in which the molar ratio of sulfur to alkali metal is about 5.2:2. when the battery is discharged to the point where the mole fraction of sulfur is about 0.72 the cathodic reactant becomes one phase in nature since all elemental sulfur has formed polysulfide salts. As the battery is discharged further, the cathodic reactant remains one phase in nature and as the mole fraction of sulfur drops so does the open circuit voltage corresponding to the change in the potential determining reaction. Thus, the battery continues to discharge from a point where polysulfide salts containing sulfur and alkali metal in a molar ratio of approximately 5.2:2 to the point where polysulfide salts contain sulfur and alkali metal in a ratio of about 3:2. At this point the battery is fully discharged.

There has been disclosed herein a hermetically sealed alkali metal battery. In view of this specification, those skilled in the art will be able to make variations of the invention which fall within the true spirit and scope of the invention. It is intended that all such modifications fall within the scope of the appended claims.

What I claim is:

1. A hermetically sealed alkali metal battery container comprising:
   a ceramic ring having top and bottom surfaces;
   an inner casing of a solid alkali ion-conductive material with one open end;
   a glass seal sealing said inner casing adjacent its open end to said ceramic ring so that said inner casing extends downwardly from the bottom surface of said ceramic ring;
   a first outer casing with an open end and a closed end, said outer casing surrounding said inner casing and spaced therefrom;
   a first ring encircling and bonded to said open end of said first outer casing, said ring (a) having a raised annular ridge encircling said open end of said first outer casing, (b) having at least a pair of openings for receiving bolts therethrough, and (c) being adjacent said bottom surface of said ceramic ring;
   a first pair of thin washers positioned between said raised annular ridge of said first ring and said bottom surface of said ceramic ring, said washer adjacent said first ring having a coefficient of thermal expansion closely matching that of said first ring and said washer adjacent said ceramic ring having a coefficient of thermal expansion closely matching that of said ceramic ring;
   a second outer casing with an open end and a closed end;
   a second ring encircling and bonded to said open end of said second outer casing, said second ring (a) having a raised annular ridge encircling said open end of said second outer casing, and (b) being adjacent said top surface of said ceramic ring, whereby said second outer casing is spaced from and extends in an opposite direction to said first outer casing;
   a second pair of thin washers positioned between said raised annular ridge of said second ring and said top surface of said ceramic ring, said washer adjacent said second ring having a coefficient of thermal expansion closely matching that of said second ring and said washer adjacent said ceramic having a coefficient of thermal expansion closely matching that of said ceramic ring;
   a Belleville spring encircling said second outer casing and engaging an upper surface of said second ring;
   a third ring encircling said second outer casing and both (a) engaging an upper edge of said Belleville spring, and (b) having at least a pair of spaced openings aligned with said openings of said first ring for receiving bolts therethrough; and
   at least a pair of nut and bolt assemblies extending through said openings in said first and said third rings and securely tightened together to draw said annular ridges on said first and said second rings tightly into engagement with said first and said second pair of washers to provide a hermetically sealed alkali metal battery container.

2. A hermetically sealed alkali metal battery container comprising:
   a ceramic ring having top and bottom surfaces;
   an inner casing of a solid alkali ion-conductive material with one open end;
   a glass seal sealing a portion of an outer wall of said inner casing adjacent its open end within and to an interior surface of said ceramic ring so that said inner casing extends downwardly from the bottom surface of said ceramic ring;
   a first outer metal casing with an open end and a closed end, said outer metal casing surrounding said inner casing and spaced therefrom;
   a first metal ring encircling and welded to said open end of said first outer metal casing, said metal ring (a) having a raised annular ridge encircling said open end of said first outer metal casing, (b) having at least a pair of openings for receiving bolts therethrough, and (c) being adjacent said bottom surface of said ceramic ring;
   a first pair of thin metal washers positioned between said raised annular ridge of said first metal ring and said bottom surface of said ceramic ring, said washer adjacent said first metal ring having a coefficient of thermal expansion closely matching that of said first metal ring and said washer adjacent said ceramic ring having a coefficient of thermal expansion closely matching that of said ceramic ring;
   a second outer metal casing with an open end and a closed end;
   a second metal ring encircling and welded to said open end of said second outer metal casing, said second metal ring (a) having a raised annular ridge encircling said open end of said second outer metal casing, and (b) being adjacent said top surface of said ceramic ring, whereby said second outer casing is spaced from and extends in an opposite direction to said first outer casing;
   a second pair of thin metal washers positioned between said raised annular ridge of said second metal ring and said top surface of said ceramic ring, said washer adjacent said second metal ring having a coefficient of thermal expansion closely matching that of said second metal ring and said washer adjacent said ceramic having a coefficient of thermal expansion closely matching that of said ceramic ring;
   a Belleville spring encircling said second outer metal casing and engaging an upper surface of said second metal ring;
   a third metal ring encircling said second outer metal casing and both (a) engaging an upper edge of said Belleville spring, and (b) having at least a pair of spaced openings aligned with said openings of said first metal ring for receiving bolts therethrough; and
   at least a pair of nut and bolt assemblies extending through said openings in said first and said third metal rings and securely tightened together to draw said annular ridges on said first and said second metal rings tightly into engagement with said first and said second pair of metal washers to provide a hermetically sealed alkali metal battery container.

3. The container of claim 2 wherein each of said washers have a thickness in the range from 0.003 to 0.005 inches.

4. The container of claim 3 wherein said washer adjacent said metal rings are formed of hardened and polished steel and said washers adjacent said ceramic ring are formed of a nickel, cobalt, iron alloy.

* * * * *